United States Patent
Clark

Patent Number: 6,035,912
Date of Patent: Mar. 14, 2000

[54] TIRE CHAIN CROSS MEMBER ASSEMBLIES AND TIRE CHAINS USING THE SAME

[75] Inventor: Larry C. Clark, Amity, Oreg.

[73] Assignee: Burns Bros., Inc., Portland, Oreg.

[21] Appl. No.: 09/033,589

[22] Filed: Mar. 3, 1998

[51] Int. Cl.[7] .................................................. B60C 11/00
[52] U.S. Cl. ........................................... 152/222; 152/243
[58] Field of Search ................................ 152/170, 221, 152/222, 231, 232, 243

[56] References Cited

U.S. PATENT DOCUMENTS

| | | |
|---|---|---|
| 1,350,484 | 8/1920 | Bailey . |
| 2,252,027 | 8/1941 | Pasquarella, Jr. . |
| 2,714,914 | 8/1955 | Champigny . |
| 3,752,204 | 8/1973 | Ouellette ................................ 152/219 |
| 4,263,954 | 4/1981 | Dwinell ................................... 152/222 |
| 4,825,923 | 5/1989 | Blankenship et al. .................. 152/213 |
| 5,056,574 | 10/1991 | Maresh et al. .......................... 152/241 |
| 5,299,613 | 4/1994 | Maresh ................................... 152/221 |

FOREIGN PATENT DOCUMENTS

| 13709 | 11/1956 | Germany ................................ 152/222 |
|---|---|---|

*Primary Examiner*—Russell D. Stormer
*Attorney, Agent, or Firm*—Vorys, Sater, Seymour and Pease LLP

[57] ABSTRACT

A tire chain cross member assembly comprises a flexible cable on which is tightly wrapped a helical wire sheath. The sheath is surrounded by a first layer of helical wire sleeves that are free to move axially and circumferentially on the sheath. Sleeves of the first layer are surrounded by a second layer of helical wire sleeves that are free to move axially and circumferentially and that form traction elements. A tire chain comprises a pair of elongated side members and a plurality of the cross member assemblies.

4 Claims, 6 Drawing Sheets

TIRE CHAIN CROSS MEMBER ASSEMBLIES AND TIRE CHAINS USING THE SAME

BACKGROUND OF THE INVENTION

This invention is concerned with improved cable-type cross member assemblies for tire chains, and with improved tire chains utilizing such assemblies.

It is desirable in the design of tire chains, to maximize traction, vehicle stability, and chain life, while minimizing wear, both of the tire and of the chain itself. The present invention provides cable-type tire chains, and cross member assemblies, with favorable characteristics in the above and other respects.

BRIEF DESCRIPTION OF THE INVENTION

In one of its broader aspects, the invention provides a novel type of cross member assembly comprising a flexible cable, a wire wound helically around the cable to form a sheath that is fixed to the cable, a first layer of helical wire sleeves surrounding the sheath and freely movable thereon axially and circumferentially, and a second layer of helical wire sleeves surrounding sleeves of the first layer and freely movable thereon axially and circumferentially, the sleeves of the second layer forming traction elements.

In another of its broader aspects, the invention provides a tire chain comprising elongate side members adapted to extend circumferentially around opposite sidewalls of a tire, and a plurality of cross member assemblies connected between the side members and adapted to extend over and across the tire tread, the tire chain including connections between the cross members and the side members, each cross member assembly of the plurality comprising a flexible cable, a wire wound helically around the cable to form a sheath that is fixed to the cable, a first layer of helical wire sleeves surrounding the sheath and freely movable thereon axially and circumferentially, and a second layer of helical wire sleeves surrounding sleeves of the first layer and freely movable thereon axially and circumferentially, the sleeves of the second layer forming traction elements.

BRIEF DESCRIPTION OF THE DRAWINGS

The invention will be further described in conjunction with the accompanying drawings, which illustrate preferred (best mode) and exemplary embodiments, and wherein.

DETAILED DESCRIPTION OF THE PREFERRED EMBODIMENTS

Figure 1:
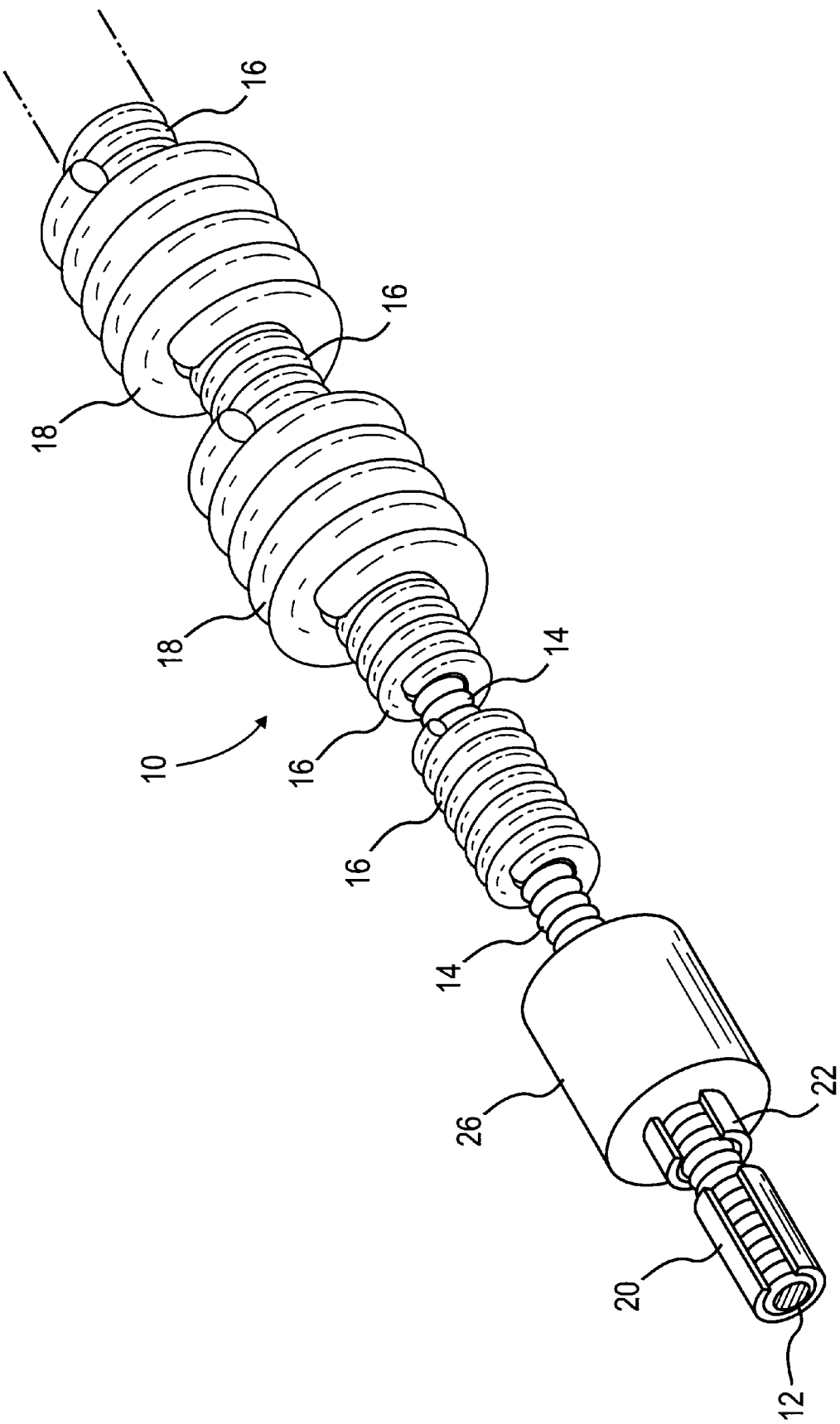
FIG. 1 is a perspective view of a portion of a cross member assembly in accordance with the invention.
Figure 2:
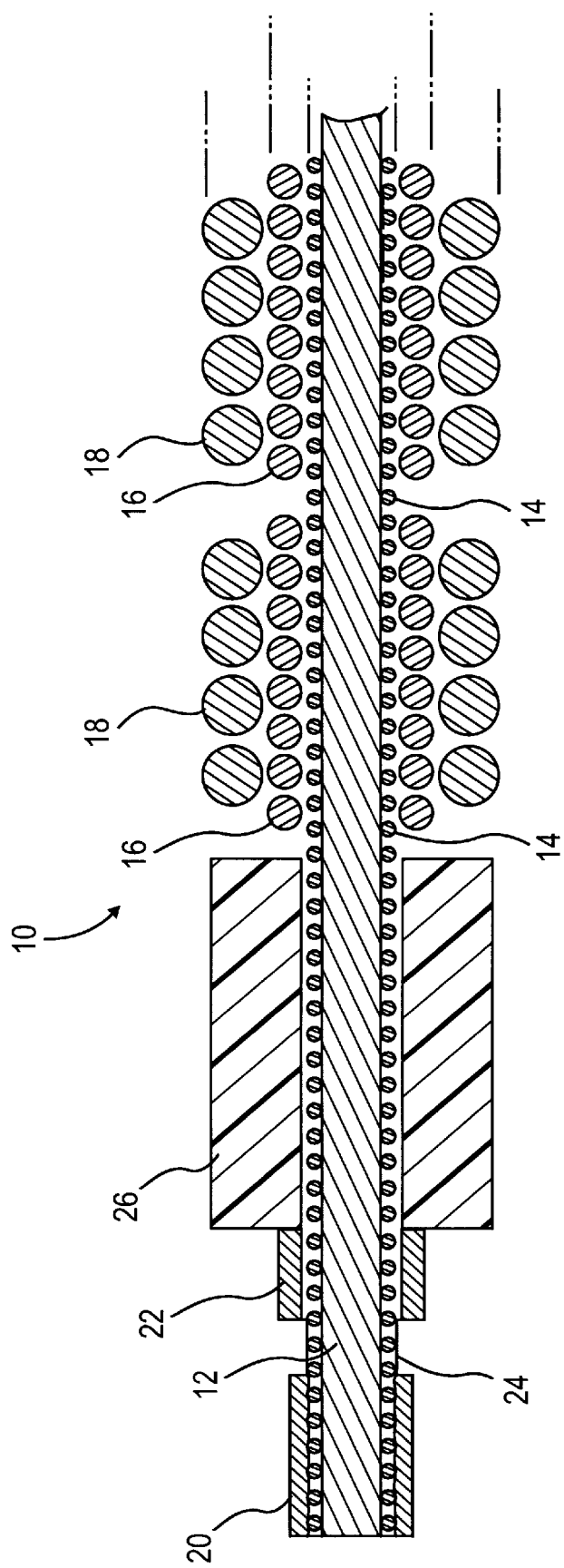
FIG. 2 is a longitudinal sectional view of a portion of the cross member assembly.

As shown in FIGS. 1 and 2, a cross member assembly 10 in accordance with the invention comprises an elongated, stranded flexible cable 12 helically wrapped tightly with plow wire that forms a sheath 14 surrounding the cable. A first layer of helical wire sleeves (springs) 16 surrounds the sheath. These sleeves are free to move axially and circumferentially on the sheath 14. A second layer of helical wire sleeves (springs) 18 surrounds sleeves of the first layer. These sleeves are free to move axially and circumferentially on sleeves 16 of the first layer. Sleeves 18 of the second layer constitute traction elements for engaging an icy or snow-covered road surface. At least some of the turns of each helical wire sleeve 18 of the second layer are spaced to provide gaps for increasing traction, and turns of each of the helical wire sleeves 16 of the first layer are also preferably spaced to provide gaps between turns.

Each end of the cross member assembly 10 has a steel double bushing, including a first bushing 20 tightly crimped onto the sheath and a second bushing 22 spaced from the sheath, the bushings being integral with a bridge 24 therebetween. Surrounding the sheath 14 adjacent to the bushing 22 is a rubber or plastic cylinder 26 forming a spacer that separates the adjacent sleeves 16 and 18 from the bushing 22. The double bushing and the spacer are disclosed in commonly owned U.S. Pat. No. 5,299,613 (incorporated herein by reference).

In one example of a cross member assembly for a ladder-type truck tire chain, the total length of each cross member assembly is 15.187 (all dimensions expressed in inches). The first layer comprises 16 sleeves, while the second layer comprises 15 sleeves. The sleeves of the first layer comprise eight turns of 0.0625 o.d. steel wire, and the sleeves of the second layer comprise five turns of 0.120 o.d. high carbon steel alloy wire. The cable constituting the core of the cross member assembly is a stranded 0.125. o.d. lubricated aircraft cable comprising seven bundles each having 19 strands. The plow wire is 0.040 o.d. high carbon steel tightly wound on the stranded cable to form a sheath of 0.198 to 0.202 o.d. The sleeves of the first layer have an o.d. of 0.360 to 0.365, an i.d. of 0.220 to 0.225 and a length of 0.790 to 0.800. The sleeves of the second layer have an o.d. of 0.615 to 0.620, an i.d. of 0.375 to 0.380, and a length of 0.840 to 0.845.

Figure 3:
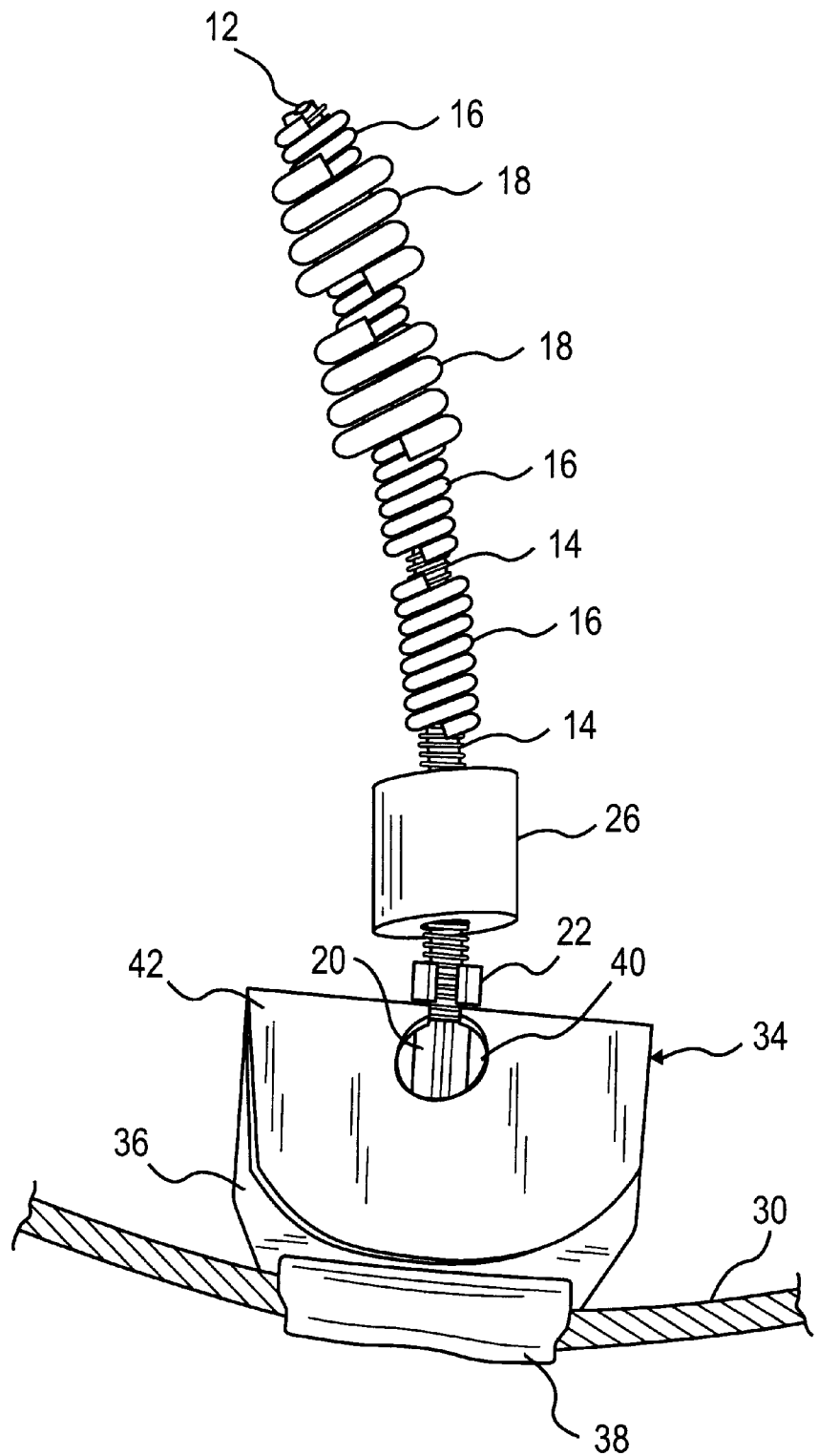
FIG. 3 is a perspective view showing the manner in which an end of a cross member assembly is attached to a side member of a tire chain.
Figure 4:
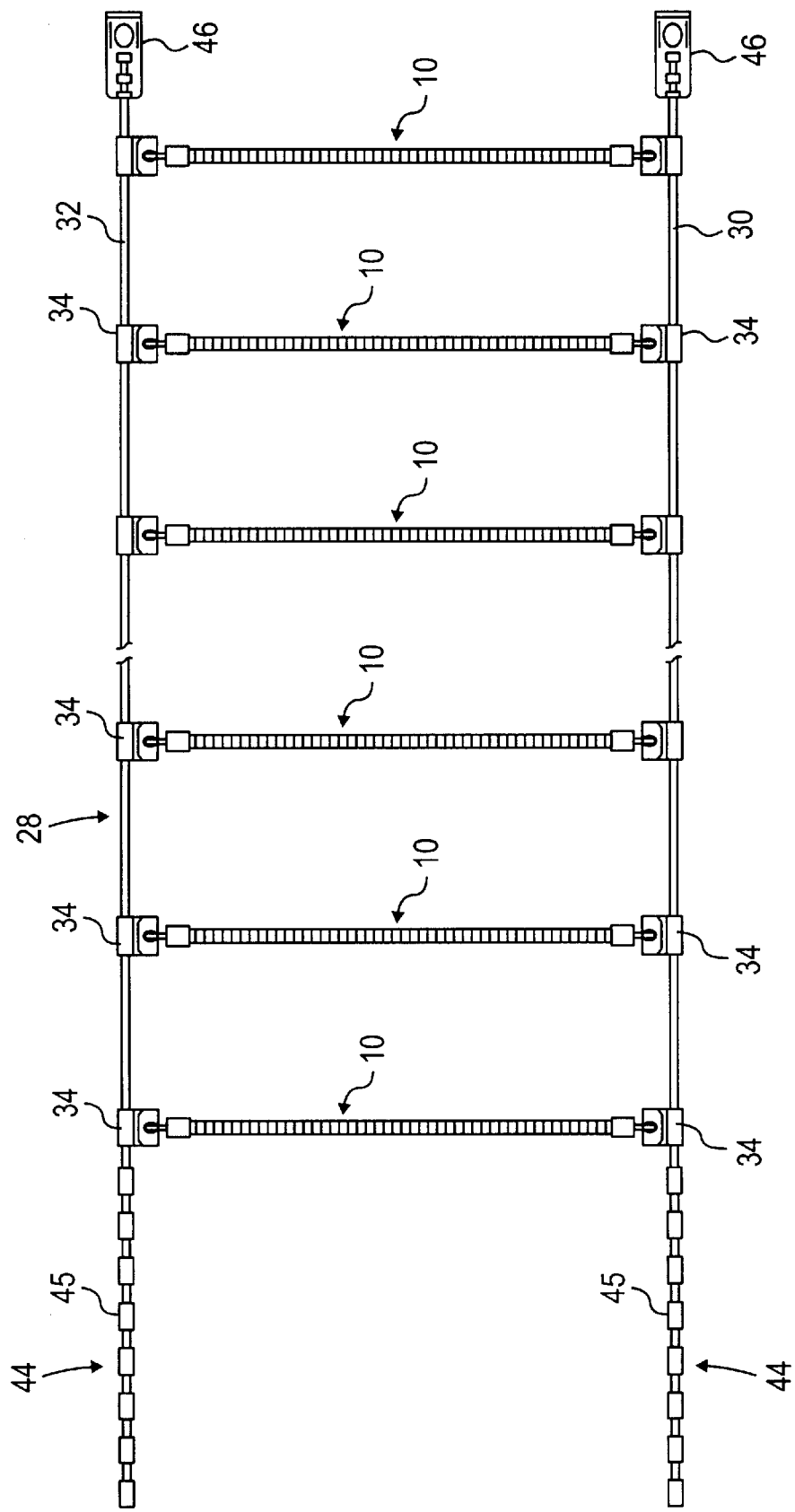
FIG. 4 is a contracted plan view of an embodiment of a tire chain in accordance with the invention.

FIG. 4 illustrates an embodiment of a tire chain 28 in accordance with the invention, comprising a pair of elongated flexible side members 30,32, which may be formed of stranded steel cable, for example, and a plurality of equally spaced cross member assemblies 10 attached to the side members by connectors 34. A typical connector 34 is shown in FIG. 3 and comprises a steel plate 36 having a sleeve 38 crimped to a side member 30 and having a keyhole-shaped opening 40 into which a bushing 20 is inserted before a tab portion 42 of the connector is bent over and flattened to trap the bushing 20 therein, as described in the aforesaid U.S. Pat. No. 5,299,613.

Opposite ends of each side member 30,32 are provided with cooperable fastener elements 44,46, one of which may comprise a plate with bridges punched from the plate and crimped over the extremity of a side cable end portion. Each plate has a keyhole-shaped opening in an angled portion for receiving one of a plurality of lugs 45 of a fastener element 44, that are crimped to the opposite end of the side cable. The effective length of the side member is determined by the number of lugs inserted through the keyhole-shaped openings, as described in commonly owned U.S. Pat. No. 3,752,204 (incorporated herein by reference).

Figure 5:
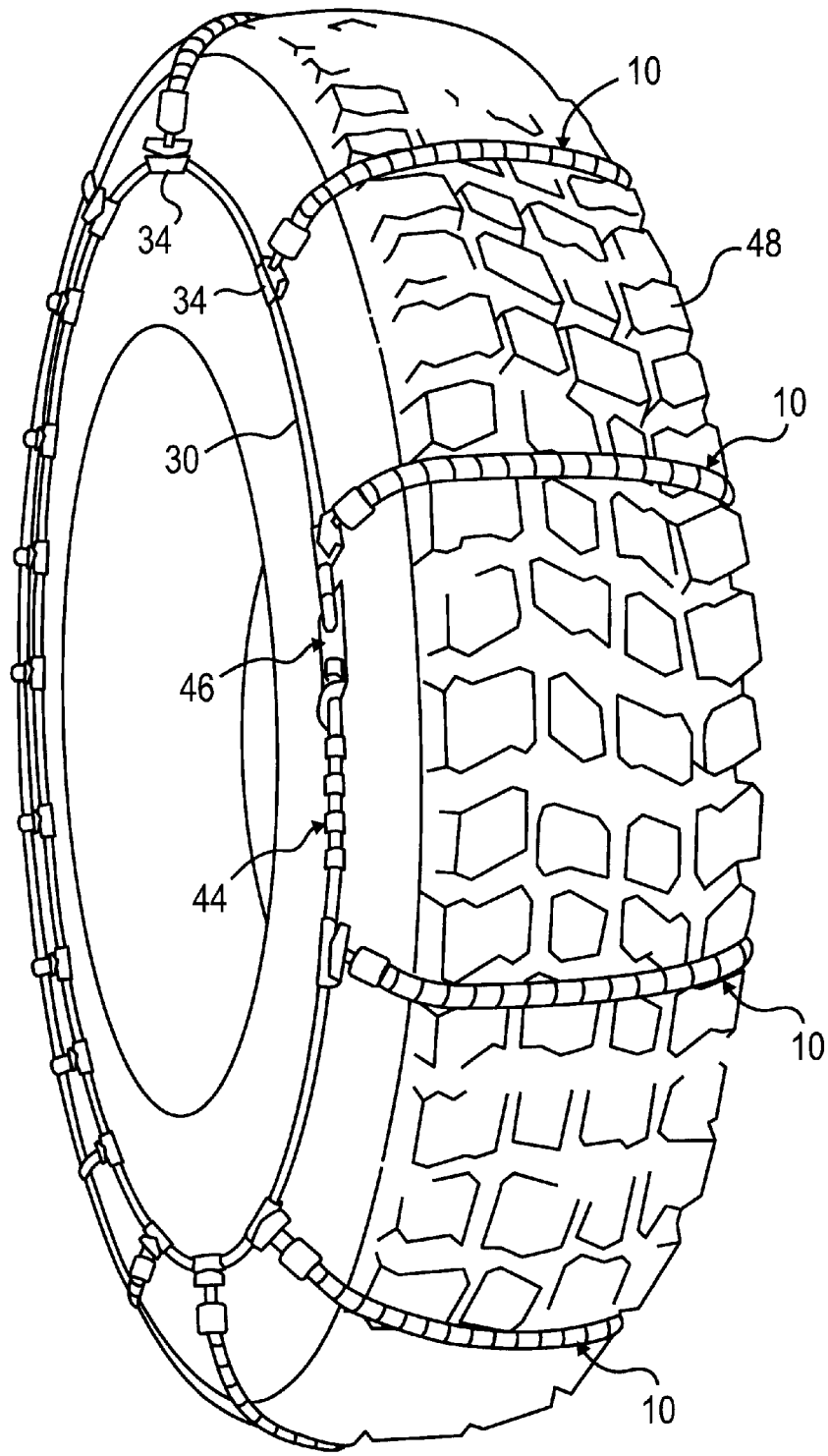
FIG. 5 is a perspective view showing a tire chain in accordance with the invention mounted on a vehicle tire.

FIG. 5 shows the tire chain 28 of FIG. 4 mounted on a tire 48. When so mounted, the side members extend circumferentially adjacent to the inner and outer sidewalls of the tire, and the cross member assemblies 10 extend over and across the tire tread.

Figure 6:
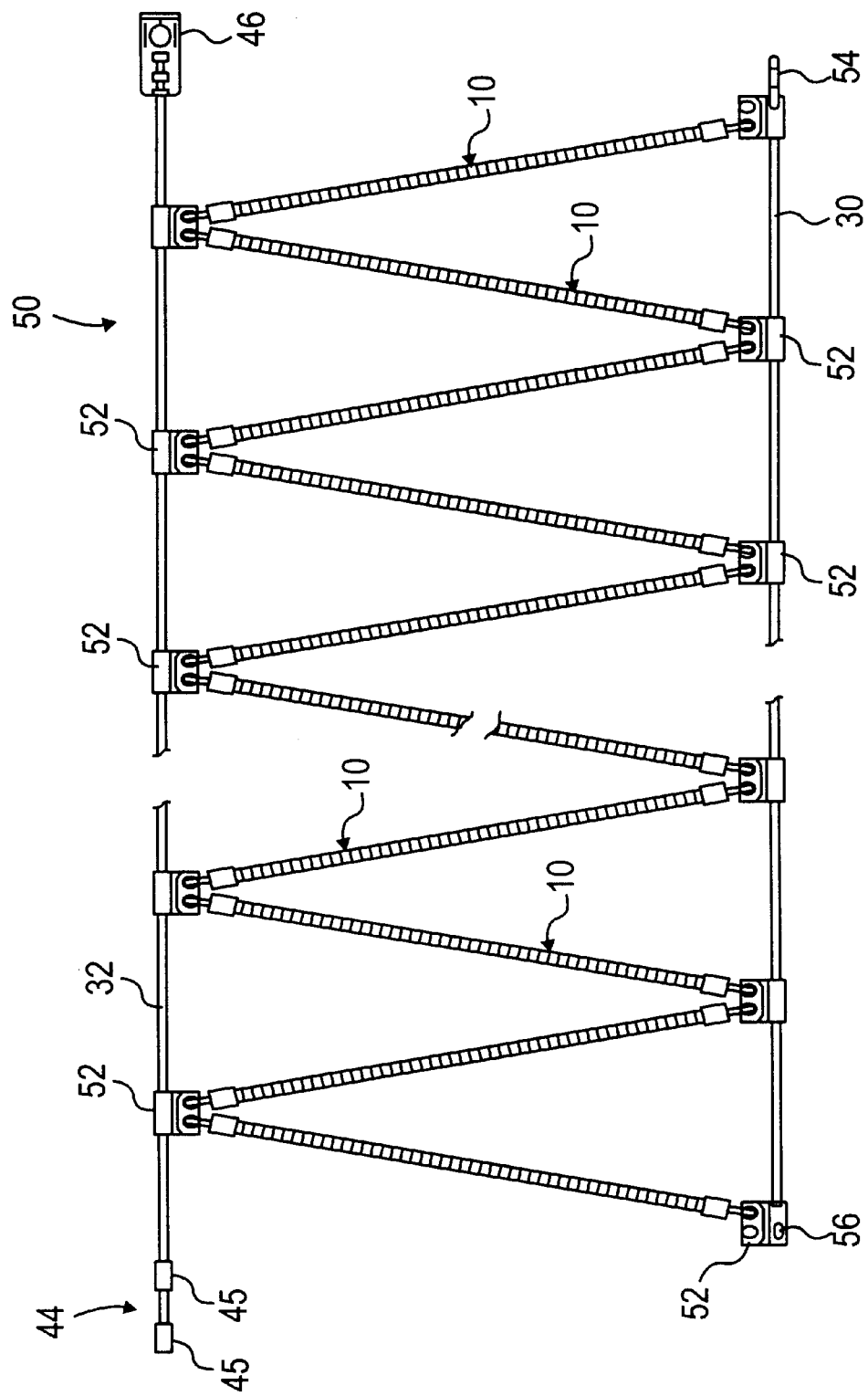
FIG. 6 is a contracted plan view of another embodiment of a tire chain in accordance with the invention.

FIG. 6 illustrates another embodiment of a tire chain 50 in accordance with the invention. While the tire chain 28 shown in FIG. 4 is a ladder-type, the tire chain 50 shown in FIG. 6 is a zig-zag type in which the cross member assemblies 10 form a zig-zag pattern. The cross member assemblies are arranged in pairs, so that the ends of successive cross member assemblies are attached to side members by connectors 52 having a pair of keyhole-shaped openings for receiving bushings of an associated pair of cross member assemblies. The outer side member 32 has end fasteners 44 and 46 like those in FIG. 4. The inner side member 30, which may be a flexible hoop, has a hook 54 at one end that mates with a hole 56 in a connector 52 at the opposite end. Further details of zig-zag tire chains are described in commonly owned U.S. Pat. No. 5,056,574 (incorporated herein by reference).

Prior cross member assemblies have had a sheathed flexible cable surrounded by a single layer of helical sleeve traction elements. Surprisingly, the present invention, in which two layers of freely movable helical wire sleeves are employed, provides substantially greater longevity of the cross member assemblies. More particularly, comparative tests of tire chains of the present invention and prior single layer tire chains have shown, impressively, that the invention provides substantially longer tire chain useful life, in which there is substantially less loss of traction elements due to breakage.

While preferred embodiments of the invention have been shown and described, it will be apparent to those skilled in the art that changes can be made without departing from the principles and spirit of the invention, the scope of which is defined in the appended claims:

The invention claimed is:

1. A cross member assembly for a tire chain, comprising a flexible cable, a wire wound helically around the cable to form a sheath that is fixed to the cable, a first layer of helical wire sleeves surrounding the sheath and freely movable thereon axially and circumferentially, and a second layer of helical wire sleeves surrounding sleeves of the first layer and freely movable thereon axially and circumferentially, the sleeves of the second layer forming traction elements.

2. A cross member assembly according to claim 1, wherein opposite ends of the cross member assembly have bushings for attaching the cross member assembly to side members of a tire chain.

3. A cable-type tire chain comprising elongate side members adapted to extend circumferentially around opposite sidewalls of a tire and a plurality of cross member assemblies connected between the side members and adapted to extend over and across a tire tread, the tire chain including connectors between the cross member assemblies and the side members, each cross member assembly of said plurality comprising a flexible cable, a wire wound helically around the cable to form a sheath that is fixed to the cable, a first layer of helical wire sleeves surrounding the sheath and freely movable thereon axially and circumferentially, and a second layer of helical wire sleeves surrounding sleeves of the first layer and freely movable thereon axially and circumferentially, the sleeves of the second layer forming traction elements.

4. A cable-type tire chain according to claim 3, wherein opposite ends of the cross member assemblies have bushings that attach the cross member assemblies to the connectors.

* * * * *